(12) United States Patent
Ruan et al.

(10) Patent No.: US 10,853,472 B2
(45) Date of Patent: Dec. 1, 2020

(54) SYSTEM, APPARATUS AND METHOD FOR INDEPENDENTLY RECOVERING A CREDENTIAL

(71) Applicant: Intel Corporation, Santa Clara, CA (US)

(72) Inventors: Xiaoyu Ruan, Folsom, CA (US); William A. Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 16/021,275

(22) Filed: Jun. 28, 2018

(65) Prior Publication Data

US 2019/0042725 A1 Feb. 7, 2019

(51) Int. Cl.
| | | |
|---|---|---|
| *G06F 21/44* | (2013.01) | |
| *H04L 9/08* | (2006.01) | |
| *G06F 21/60* | (2013.01) | |
| *G06F 21/57* | (2013.01) | |
| *H04L 9/32* | (2006.01) | |
| *G06F 8/654* | (2018.01) | |
| *G06F 8/65* | (2018.01) | |

(52) U.S. Cl.
CPC .............. *G06F 21/44* (2013.01); *G06F 8/654* (2018.02); *G06F 21/572* (2013.01); *G06F 21/602* (2013.01); *H04L 9/0825* (2013.01); *H04L 9/3247* (2013.01); *H04L 9/3265* (2013.01); *G06F 8/65* (2013.01)

(58) Field of Classification Search
CPC ...... G06F 21/572; G06F 21/602; G06F 21/44; G06F 8/65; G06F 8/654; H04L 9/3247; H04L 9/0825; H04L 9/3265

USPC ........................................................ 726/23
See application file for complete search history.

(56) References Cited

U.S. PATENT DOCUMENTS

| | | | | |
|---|---|---|---|---|
| 7,937,754 | B2* | 5/2011 | Katano | G06F 8/65 726/18 |
| 2004/0030877 | A1* | 2/2004 | Frid | G06F 8/654 713/1 |
| 2004/0199615 | A1* | 10/2004 | Philyaw | G06F 9/4411 709/220 |
| 2005/0060527 | A1* | 3/2005 | Philyaw | H04L 29/12594 713/1 |
| 2005/0108700 | A1* | 5/2005 | Chen | G06F 8/65 717/168 |
| 2006/0037065 | A1* | 2/2006 | Ekers | H04L 63/0407 726/5 |

(Continued)

OTHER PUBLICATIONS

NPL Search Results (Year: 2020).*
Lenovo, "Intel Management Engine Firmware Update Tool," Version 6.2.61.3535, 2011, 1 page.

*Primary Examiner* — Syed A Zaidi (74) *Attorney, Agent, or Firm* — Trop, Pruner & Hu, P.C.

(57) ABSTRACT

In one embodiment, an apparatus includes a non-volatile storage to store a seed value and a signature that is based on an iterative execution of a function for a predetermined number of intervals. The apparatus may further include the security processor coupled to the non-volatile storage, where the security processor is to independently recover a credential for an updated version of the firmware based at least in part on the seed value and a security version number for the updated version of the firmware. Other embodiments are described and claimed.

20 Claims, 8 Drawing Sheets

(56) References Cited

U.S. PATENT DOCUMENTS

| | | | |
|---|---|---|---|
| 2006/0170661 A1* | 8/2006 | Clynes | G06F 8/65 345/204 |
| 2007/0044153 A1* | 2/2007 | Schuba | H04L 63/1433 726/24 |
| 2007/0067765 A1* | 3/2007 | Motta | G06F 8/658 717/168 |
| 2008/0148250 A1* | 6/2008 | Motta | G06F 8/658 717/170 |
| 2012/0135719 A1* | 5/2012 | Haughn | G06F 8/65 455/414.1 |
| 2012/0311332 A1* | 12/2012 | Johnsen | H04L 9/3234 713/168 |
| 2013/0145424 A1 | 6/2013 | Wang et al. | |
| 2014/0164767 A1 | 6/2014 | Ruan et al. | |
| 2016/0036722 A1* | 2/2016 | Obrecht | G06F 21/554 709/226 |
| 2016/0306622 A1* | 10/2016 | Kim | G06F 8/654 |

* cited by examiner

SYSTEM, APPARATUS AND METHOD FOR INDEPENDENTLY RECOVERING A CREDENTIAL

TECHNICAL FIELD

Embodiments relate to credential recovery techniques.

BACKGROUND

For many applications, a device presents a unique credential to authenticate to a trusted verifier. When a vulnerability in device firmware is found and fixed through a firmware update, its unique credential is considered compromised and is replaced. Typical protocols for credential recovery use online revocation and renewal servers. However, this online recovery technique has several problems including that it is not acceptable: for systems in closed environments where internet connection is not available (e.g., military, defense, government); for simple hardware and firmware subsystems lacking a software stack for remote server access; or where proof of recovery is required before internet access is available, such as boot integrity verification or link authentication.

And with recovery techniques dependent on a remote server, a device is typically required to be configured with a complex platform architecture since most firmware cannot directly access the internet, dictating that to perform credential renewal, a software stack be developed and installed on every platform. These conventional techniques also incur high cost to a vendor to establish and maintain a server with high capability for handling large credential traffic renewal upon a firmware update release. Further, conventional techniques may also lead to a bad user experience as there is a time period in which the firmware is out of service, between firmware update and receipt of a new credential from the remote server.

DETAILED DESCRIPTION

In various embodiments, a computing device may be configured to independently perform credential renewal techniques. Embodiments provide such independent techniques in that a credential may be locally generated within a system without any information other than a new firmware version itself (and several pre-configured values), as described herein. As such, embodiments enable a device to internally recover a credential without communication with a server or other remote credential provider.

More specifically, embodiments provide a credential chain for different firmware versions, e.g., each identified by security version number (SVN), using a one-way function (such as hash). To this end, a device may independently derive a credential associated with a particular firmware version by iteratively applying the one-way function on a secret seed. In this way, a computing device may realize symmetric credential recovery that may significantly simplify platform architecture and eliminate supportive software or an external server. With an embodiment, when a firmware vulnerability is found and fixed via firmware update, an original equipment manufacturer/original device manufacturer (OEM/ODM) will no longer need to spend large amounts of money and resources to re-provision credentials for the updated firmware in the field.

Figure 1:
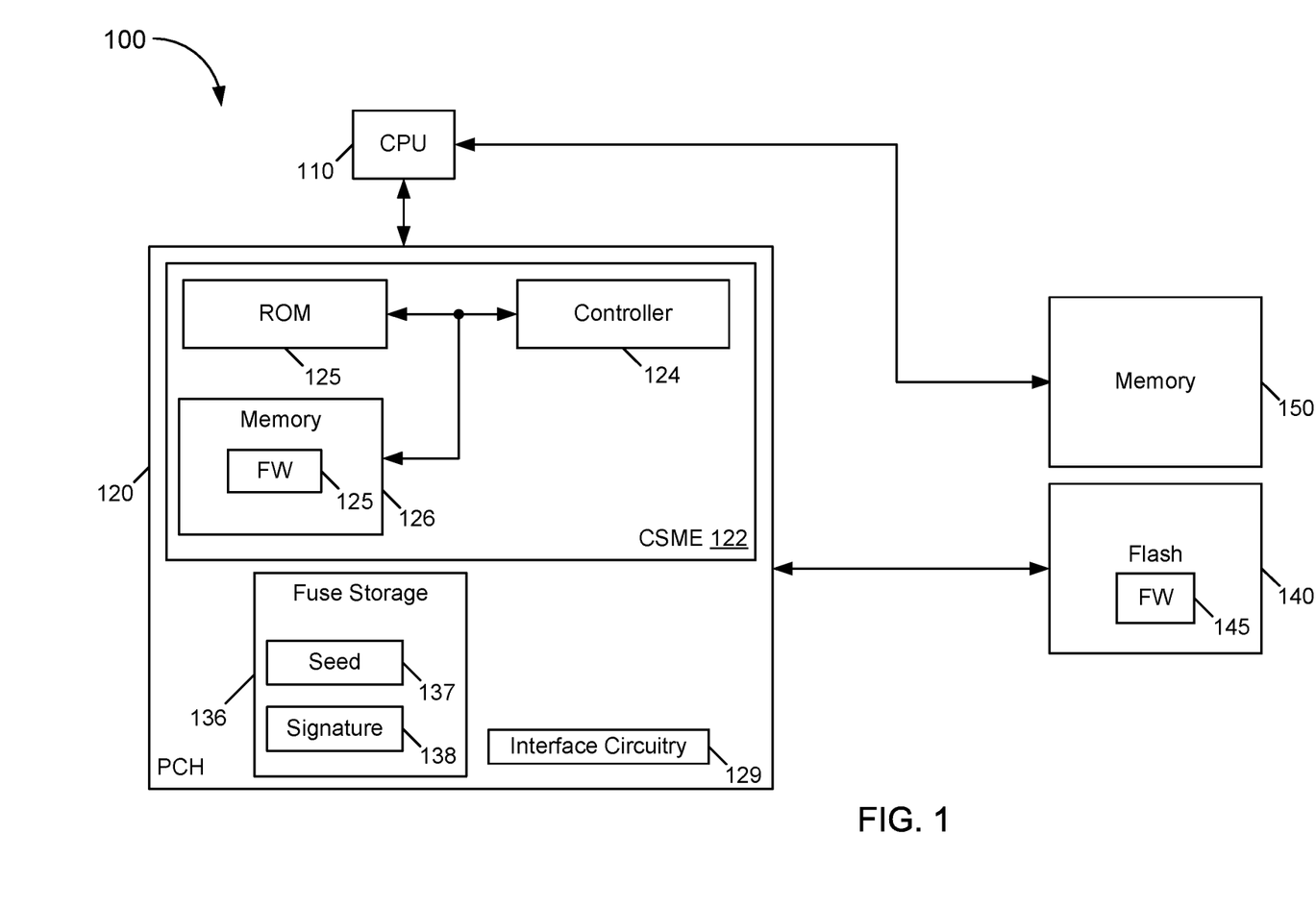
FIG. 1 is a block diagram of a system in accordance with an embodiment of the present invention.

Referring now to FIG. 1, shown is a block diagram of a system in accordance with an embodiment of the present invention. In various embodiments, system 100 may be any type of computing device, ranging from a small form factor device such as a connected device, smartphone, tablet computer, laptop computer or so forth, to a larger system such as a desktop computer, server computer or so forth. In the high level embodiment shown in FIG. 1, system 100 includes a central processing unit (CPU) 110. In various embodiments, CPU 110 may be a multicore processor, embedded processor or other system on chip (SoC). Although only a single CPU is shown for ease of illustration, understand that some systems may include multiple CPUs or other processors.

As further illustrated in FIG. 1, CPU 110 couples to a peripheral controller hub (PCH) 120. Although shown in the embodiment of FIG. 1 as a separate component (e.g., a separate integrated circuit), understand the scope of the present invention is not limited in this regard and in some embodiments PCH 120 may be integrated within a single package with CPU 110. PCH 120 includes interface circuitry 129, which may act as an interface between PCH 120 and various peripheral devices (not shown for ease of illustration in FIG. 1).

Of interest herein, PCH 120 further includes a converged security and manageability engine (CSME) 122. CSME 122 is a separate processor from CPU 110 and may be used for performing security operations within system 100, including independent firmware credentialing as described herein. In an embodiment, CSME 122 may be implemented in chipsets or other integrated circuits manufactured and sold by Intel Corporation, Santa Clara, Calif. Thus while this particular embodiment shows a specific security processor, more generally, a PCH, CPU or other integrated circuit may include a standalone security processor to perform operations as described herein. Understand that a security processor may include one or more controllers, e.g., in the form of a microcontroller, general-purpose processing core, specialized processing engine or so forth. In addition, the security processor may include or be associated with some type of secure storage to store programmable code for booting and executing security operations within the security processor. In some embodiments, a security processor further may include secure communication circuitry to communicate via one or more secure channels with other components, e.g., within a given computer system or via a network.

In the embodiment shown in FIG. 1, CSME 122 includes a controller 124, which may be any type of microcontroller, processor core or so forth to execute programmable instructions. To this end, controller 124 couples to a read only memory (ROM) 125, which may store a boot loader for CSME 122. During boot operations, the boot loader may execute within controller 124 to enable boot operations, including loading of firmware, such as firmware 145 stored in a non-volatile memory (NVM) 140. Understand while FIG. 1 shows an implementation of NVM 140 that is a flash memory, other non-volatile memories may be present in other embodiments. To enable execution of this firmware, which is firmware for CSME 122, this firmware image 125 may be stored in a memory 126. Note that memory 126 may be a dedicated memory of CSME 122 such as static random access memory (SRAM) or other volatile memory. Of course, NVM 140 may further store additional firmware for system 100, including a basic input/output system (BIOS) to be executed by CPU 110. Note that firmware image 145 is associated with an SVN. Without loss of generality, the SVN may start from 1 and increment by 1 per each firmware update. For example, when a vulnerability is identified in firmware of SVN=n, the vendor will revoke the credential, fix the vulnerability and release firmware of SVN=n+1.

As further illustrated in FIG. 1, PCH 120 also includes a fuse storage 136, which may store various information written into it during manufacturing operations. Of interest herein, fuse storage 136 may store a seed 137 and a signature 138, both of which may be written into fuse storage 136 during manufacturing, details of which are described further below. Note that signature 138 may be read by firmware 145, as this value is not a secret. However, seed 137 is considered a secret value that is prevented from being read by firmware 145 (although it is accessible by controller 124 via execution of code stored in ROM 125). As also illustrated, system 100 may include a system memory 150 coupled to CPU 110, and which may be implemented as a dynamic random access memory (DRAM) or other volatile memory. Understand while shown at this high level in the embodiment of FIG. 1, many variations and alternatives are possible.

Figure 2:
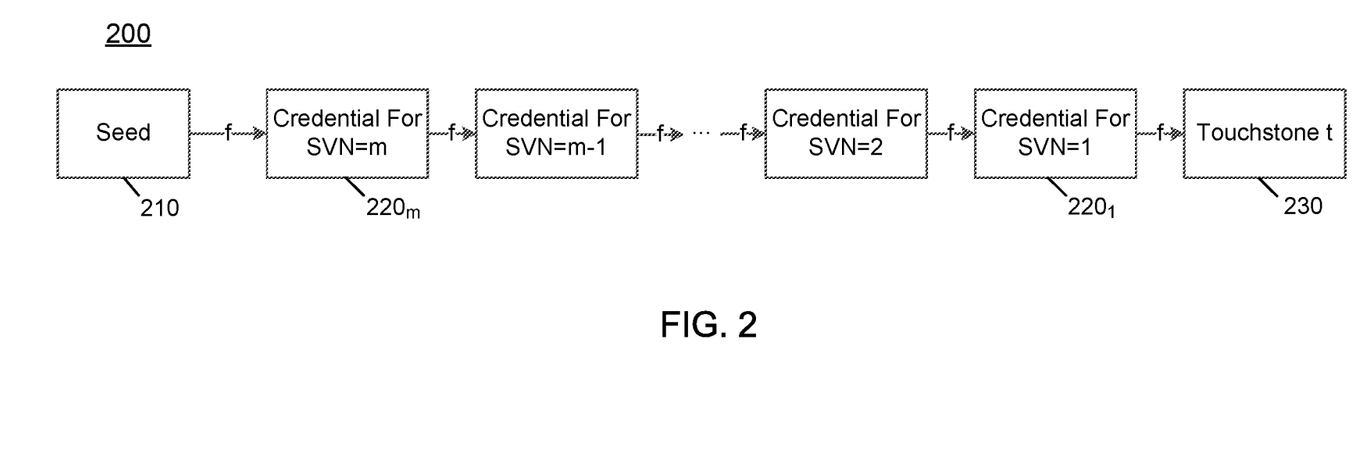
FIG. 2 is a graphical illustration of a one-way credential chain in accordance with an embodiment.

Referring now to FIG. 2, shown is a graphical illustration of a one-way credential chain in accordance with an embodiment. As illustrated in FIG. 2, credential chain 200 includes a plurality of nodes, namely m+2 nodes, where m is the number of supported firmware versions. More specifically, a firmware designer may select a predetermined value that corresponds to a maximum expected amount of potential firmware versions, such that as updates are developed (e.g., in response to detection of bugs, security attacks or so forth), another firmware version is provided, e.g., by way of patch or other update. Although embodiments herein describe such version information in the context of a security version number (SVN), other embodiments are possible. In a particular embodiment, this SVN is an incrementing integer value, such that an original firmware version, e.g., provided with a system upon manufacture may be set at an SVN of 1. Thereafter, as firmware updates are provided in the field, the SVN may be incremented, e.g., by one per firmware update, to a maximum value. In one embodiment this maximum value may be set at 32. Note that in some cases, firmware versions may increment by a different number (e.g., one or more numbers may be skipped).

As illustrated in FIG. 2, credential chain 200 includes plural nodes including a seed node 210, which in an embodiment may be a randomly generated seed value that is stored in fuse storage of a device. In an initial iteration of credential generation, this seed value may be provided as an input to a given function, e.g., a one-way function (f). The resulting output of this one-way function is iteratively provided in turn as an input to the function, to generate nodes $220_m$-$220_1$, where each of these nodes is a corresponding credential for a given firmware version. The final output of the one-way function is a touchstone value (t), shown as touchstone node 230. As described herein, the seed value and a signature generated based at least in part on the touchstone value may be stored in fuse storage or other non-volatile storage during manufacture. Then during operation, credentials may be independently generated using one-way credential chain 200. Thus as seen in FIG. 2, credentials of all SVNs may be placed in one-way credential chain 200, where m is the number of SVNs supported by the vendor on the device, and f is a one-way function. A given node can derive all nodes to its right but cannot derive any node to its left. And it takes (m+1) steps to traverse from seed 210 to touchstone node 230. Of course in other cases, an original firmware version may be set at a maximum value and updates cause a decrement to the SVN. In this case, credential chain 200 becomes: Seed; credential for SVN=1; credential for SVN=2; . . . ; credential for SVN=m=touchstone. In other words an earlier firmware release's credential is to the right of a later firmware release's credential.

During manufacturing, a vendor may perform operations to generate several values for storage in a device to enable independent generation of a one-way credential chain. In an embodiment, this process includes: generation of a random seed for the device; starting from the seed, iterative execution of a one-way function f on the seed (for the first iteration) or output off (for remaining iterations) for m+1 iterations, resulting in a "touchstone", t. Next the manufacturer signs t, resulting in a signature, and writes the seed and signature into a non-volatile storage (e.g., security fuses of the device).

Figure 3:
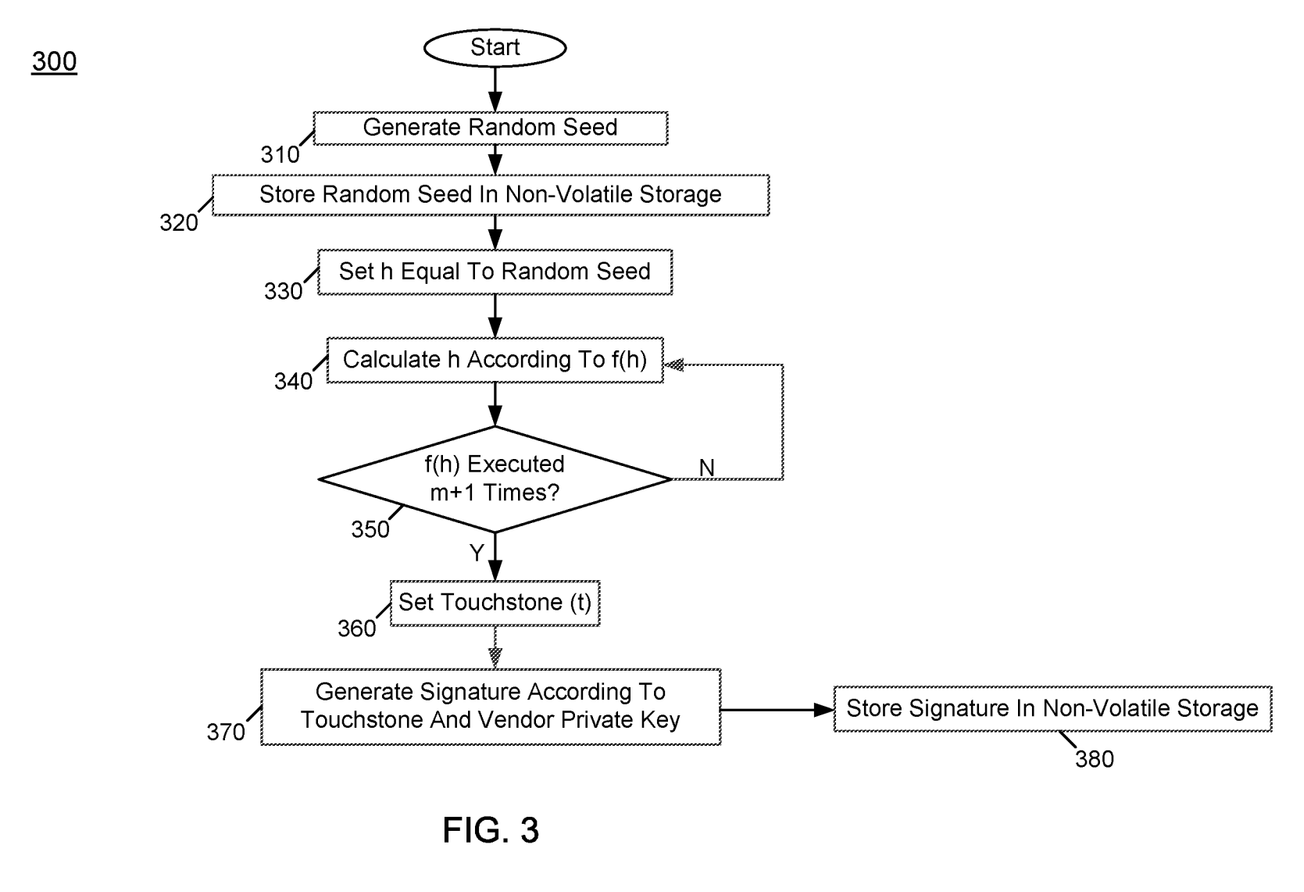
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 is a method for generating a credential chain during manufacture of an integrated circuit. As such, method 300 may be performed during integrated circuit manufacture and can be performed by hardware circuitry, firmware, software and/or combinations thereof. As one example, method 300 may be executed by hardware circuitry that executes instructions stored in a non-transitory storage medium. In a particular embodiment, a manufacturing system such as a server computer may perform method 300 to generate credentials and store information associated with the credentials in a given integrated circuit. As an example, method 300 may be performed during manufacture operations, such as after final testing and as part burning in of various vendor information into the integrated circuit.

As illustrated, method 300 begins by generating a random seed (block 310). Understand that this random seed is a unique random value for association and storage into a single integrated circuit. The random seed value may be generated according to various techniques, such as by a random number generator or pseudo-random number generator. In one embodiment, the random seed value may be 256 bits; however, the scope of the present invention is not limited in this regard and in different implementations, the seed value may have a length between approximately 128 and 512 bits. Next at block 320 this random seed value is stored into a non-volatile storage of the integrated circuit. For example, the random seed value may be burned into a fuse storage of the integrated circuit.

Still referring to FIG. 3, next control passes to block 330 where a variable h may be set to this random seed value. Next, control passes to block 340 where this variable h is calculated according to a given one-way function (e.g., f(h)).

As one example, the one-way function may be implemented by a given hash function. Of course other types of one-way functions such as scalar multiplication on an elliptic curve or message authentication code (MAC)-based key derivation function may be used.

Next it is determined whether this hash function has been executed m+1 times (diamond 350). Note that the value m is a predetermined value that corresponds to an allocated number of version numbers for a firmware image. Although the scope of the present invention is not limited in this regard, in one embodiment m may be set to 32. In embodiments a system designer may select a value of m so that an appropriate buffer size is maintained while at the same time allowing for numerous firmware updates in the field to occur, where each firmware update may be associated with a different credential, to be independently derived by a device as described herein.

Still with reference to FIG. 3, if it is determined that the m+1 iterations of the one-way function have been calculated, control passes to block 360 where the final output of the one-way function may be set as a touchstone value t. This touchstone value also may be referred to as a "chain public key" as it is not a secret value; understand however that this chain public key is not a public value of an asymmetric cryptographic technique. Finally, a signature may be generated according to this touchstone value and a vendor private key. This vendor, which acts as a certificate authority (CA), may be the integrated circuit manufacturer or a trusted CA entity (such as VeriSign or Entrust).

A certificate, referred to herein as a "touchstone certificate," is a data structure that may be formed with this touchstone, signature and additional information such as name of device, serial number validity period, etc. In one embodiment, this touchstone certificate is a non-secret data structure that includes: device name (which may be not device-unique and thus may be hard coded in ROM or firmware); serial number (which is device unique and can be derived from seed/touchstone); validity period (which may be not device-unique and thus may be hard coded in ROM or firmware); touchstone value (which is device unique and is derived from the seed); and a CA signature on these fields, and which is device unique and stored in fuse or other non-volatile storage.

In different examples, the signature generation may be performed according to Rivest Shamir Adleman (RSA), Digital Signature Algorithm (DSA) or Elliptic Curve DSA (ECDSA) using this vendor private key, which is a single key that is maintained private to the integrated circuit manufacturer. As one example, a single private key may be used to generate signatures for a given manufacturing run of a particular integrated circuit. Note that for different versions of the integrated circuit, such as for different stock keeping units (SKUs), a different vendor private key may be used. Or in other embodiments, a single vendor private key may be used to generate signatures for multiple different versions of integrated circuits manufactured and sold by the integrated circuit manufacturer.

Finally with further reference to FIG. 3, control passes to block 380 where this signature may be stored in the non-volatile storage. Understand while shown at this high level in the embodiment of FIG. 3, many variations and alternatives are possible. For example, while the storage of the random seed value and the signature are shown at different points in the method flow, it is equally possible for these values to be written at the same time, e.g., at a conclusion of method 300 when the signature is generated.

After manufacturing and during normal device operation, the device may generate an appropriate credential for a given firmware version during boot. To this end, boot code of a device security processor may perform the following operations: read the seed and signature from non-volatile storage; load and verify firmware of SVN=n, where $1<=n<=m$. Then, starting from the seed, run (m+1-n) iterations of the one-way function "f", with a result "c" that is the firmware credential for SVN=n, (an analog of "password" in a traditional login interface). In turn, the security processor may output the SVN (n), credential (c), and the vendor's signature (sig) to firmware of the security processor.

Figure 4:
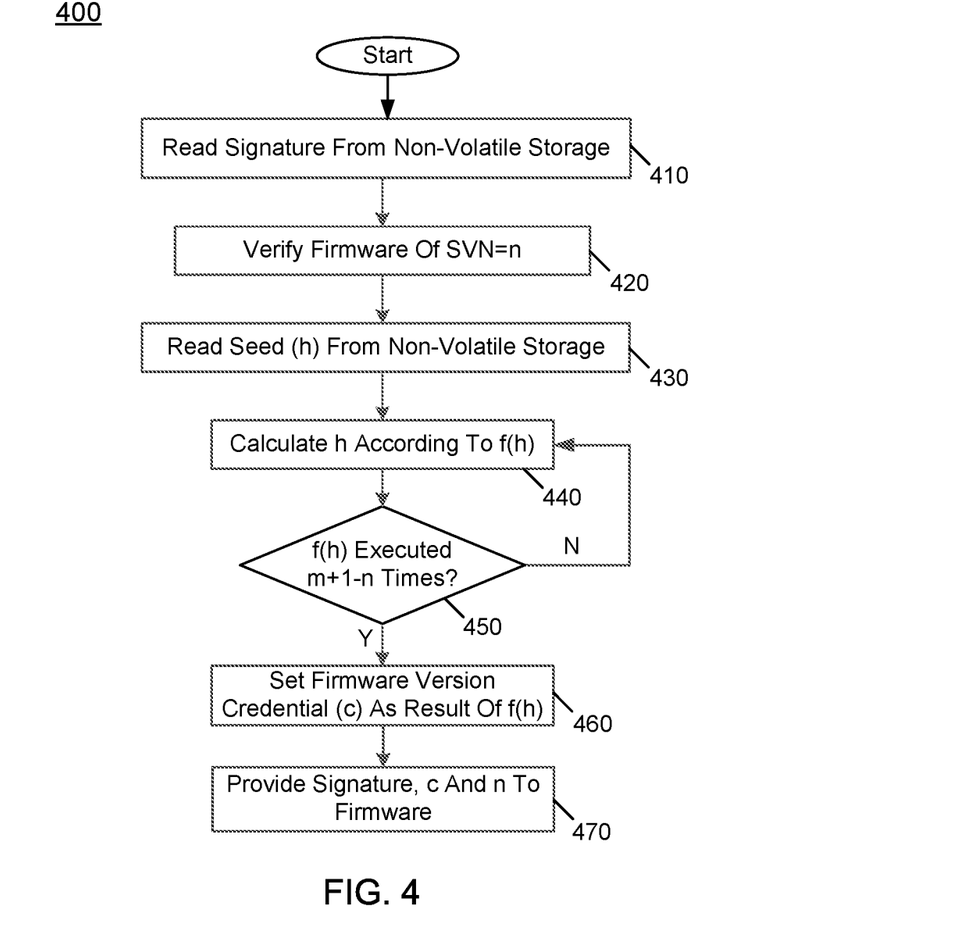
FIG. 4 is a flow diagram of a method for boot operations of a security processor in accordance with an embodiment.

Referring now to FIG. 4, shown is a flow diagram of a method for boot operations of a security processor in accordance with an embodiment. More specifically, method 400 shown in FIG. 4 is a method for providing certain credential information to firmware of the security processor during boot up operations, e.g., by way of execution of boot code, such as boot loader code stored in the security processor. As such, method 400 may be performed by hardware circuitry, firmware, software and/or combinations thereof. In a particular embodiment, a controller of the security processor, such as a microcontroller or other processor core may execute method 400.

As illustrated in FIG. 4 method 400 begins by reading a signature from a non-volatile storage (block 410). More specifically, this signature may be obtained from fuse storage and is the signature stored during the manufacturing process as described above. Next, control passes to block 420, where the firmware of a given firmware version (namely having a SVN number (e.g., n)) is verified. In one embodiment, firmware verification may be performed, e.g., by verifying the manufacturer's digital signature on the firmware image. Assuming the firmware verification is successful, next control passes to block 430 where the random seed value may be read from the non-volatile storage to be used as an initialization value for executing a one-way function. Note that this random seed value is protected to be read only by this boot code (and not device firmware). As such, at block 430 the value of a variable h may be set to this random seed value.

Control next passes to block 440 where the variable h is calculated according to the given one-way function (e.g., f(h)). Next it is determined whether this function has been executed m+1−n times (diamond 450), where m is the maximum SVN and n is the current SVN. As such, when it is determined that m+1−n iterations of the one-way function have been executed, control passes to block 460 where this resulting one-way function output, c, is set as a credential for the given firmware version. Stated another way, this resulting value (c) corresponds to the firmware credential for the given firmware version. Note that this credential is an analog of a password for a conventional login interface. At block 470 the version number (n), this credential (c) and the signature may be output to the firmware itself. As described further below, in turn the firmware (which also may execute on the same microcontroller) may generate a value to be sent to an external verifier, such as a trusted verifier associated with a content provider, along with the signature, firmware credential and SVN.

During authentication to a verifier, the firmware (e.g., SVN=n) may use this credential and the version number to calculate a touchstone t, by iteratively running the one-way function n times starting from c. Next, the security processor (via the firmware) can establish a secure session with the verifier, including authenticating the verifier, and within this secure session, send n, c (the "password"), t, and sig to the verifier.

Figure 5:
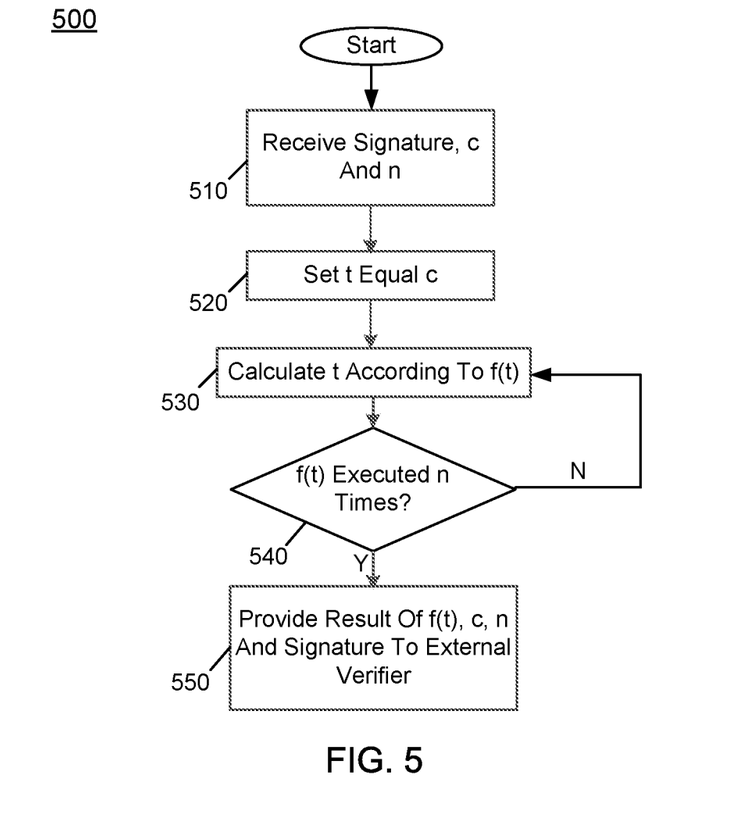
FIG. 5 is a flow diagram of a method for a firmware version credential determination in accordance with an embodiment of the present invention.

Referring now to FIG. 5, shown is a flow diagram for a firmware version credential determination in accordance with an embodiment of the present invention. As illustrated in FIG. 5, method 500 is a method for interacting between device firmware and an external verifier in accordance with an embodiment. As illustrated in FIG. 5, which is from the point of view of the firmware, method 500 is used to generate a touchstone value and provide it, along with other information, to an external verifier. In one embodiment, method 500 may be performed by a controller of the security processor that executes the firmware.

As illustrated, method 500 begins by receiving a signature, a credential value (c) for a given firmware version and the SVN (n) from the device boot (block 510). Thereafter, control passes to block 520 where a variable (t) to be used in a one-way hash function is set equal to this credential value (c) (block 520). Control thereafter passes to block 530 where this variable t is calculated according to the given one-way function. Next it is determined whether this function has been executed n times (diamond 540). Thus at the conclusion of these n iterations of the one-way function, the touchstone value is generated namely as a final result or output of f(t). This final result is thus the touchstone. At block 550, this value may be provided, along with the signature, the firmware credential, and the SVN to an external verifier.

In an embodiment, this communication may be via a secure channel present in a secure session between the security processor and the external verifier. In various embodiments, note that this external verifier may be remotely located from the security processor, and may couple thereto via a network, e.g., the internet. In turn, the verifier, to perform an authentication of the device firmware, may use these values. More specifically, the verifier may first verify the vendor's signature sig on t, using the vendor's public key. Next the verifier verifies c (the device's "password") by iteratively running the one-way function n times and comparing the result with the touchstone value t. If the result is equal to t, then the firmware's identity is verified; otherwise the authentication has failed.

Figure 6:
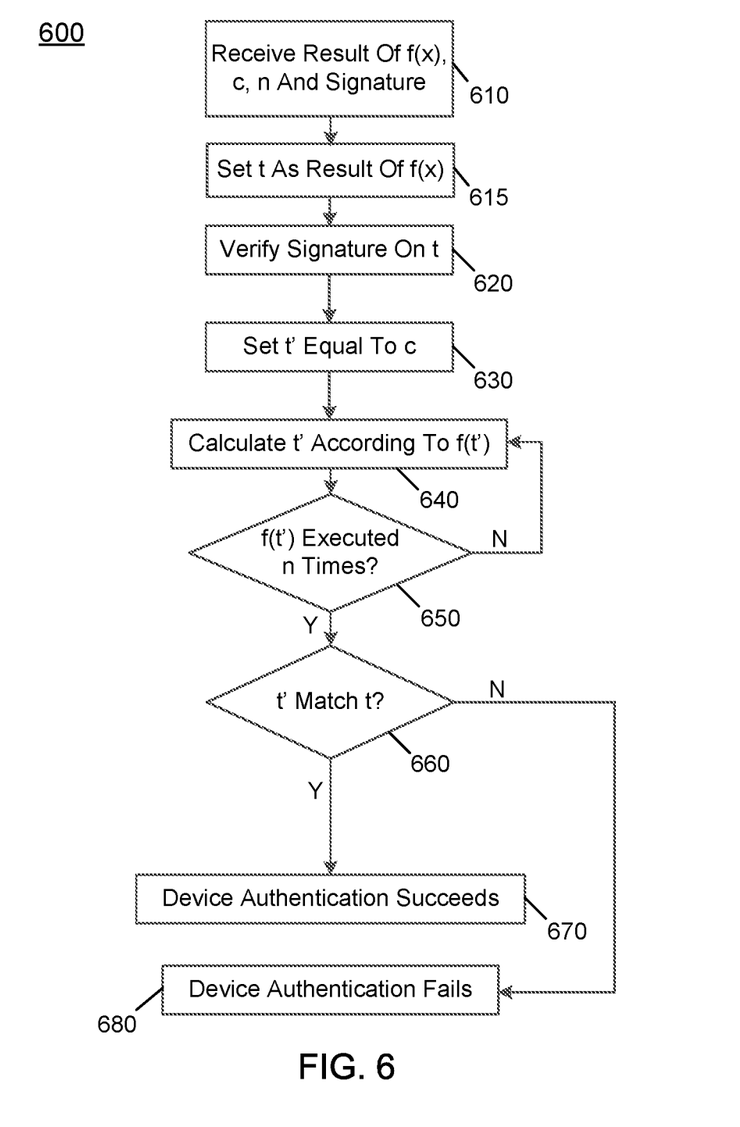
FIG. 6 is a flow diagram of a method for device authentication in accordance with an embodiment of the present invention.

Referring now to FIG. 6, shown is a flow diagram of a method for device authentication in accordance with an embodiment of the present invention. More specifically FIG. 6 is a method for verifying authenticity of a firmware of a security processor by an external verifier. As such method 600 may be performed by hardware circuitry, firmware, software and/or combinations thereof. In a particular embodiment, a verification server of a content provider may include one or more processors to execute instructions to implement method 600, where such instructions are stored in a non-transitory storage medium.

As illustrated, method 600 begins by receiving the touchstone value (a final result of f(t)), the signature, the firmware credential, and the SVN (block 610). At block 615, a variable t is set as the final result of f(t). Next, control passes to block 620 where the signature on the touchstone may be verified. In one embodiment, this verification may be performed by using a public key of the vendor provided to the trusted verifier. In one embodiment, this public key may be hard coded within code of the verifier. Next, control passes to block 630 where a comparison touchstone value (t') may be set to an initial value of c, namely the received credential for the given firmware version. Control next passes to block 640, where this comparison touchstone value t' is calculated according to the given one-way function. It is then determined whether this function has been executed n times (diamond 650). Thus at the conclusion of these n iterations of the one-way function, the comparison touchstone value is generated namely as a final result or output of f(t').

Thereafter at diamond 660 it is determined whether the comparison touchstone value t' matches the received touchstone t. If so, control passes to block 670 where the device authentication succeeds. As such, post-authentication activity may occur. As one example, the external verifier may provide one or more cryptographic keys to the security processor. In turn, the security processor may use these keys, to decrypt encrypted content received from the external verifier (e.g., a content provision server of the external verifier). Other post-authentication operations such as secret data storage on the security processor of course may occur in this and other examples.

Still with reference to FIG. 6, instead if it is determined that the comparison touchstone value does not match the received touchstone, control passes to block 680 where the device authentication is reported to fail. As such, no cryptographic keys are released to the security processor. In some embodiments, this failure may be reported, e.g., to the security processor or other appropriate entities such as the manufacturer's log server. Understand while shown at this high level in the embodiment of FIG. 6, many variations and alternatives are possible.

In embodiments, because one can derive the credential of a lower SVN from the credential of a higher SVN, the firmware update happens in the order of a smaller SVN to a higher SVN, e.g., it is forbidden to downgrade firmware from SVN=4 to SVN=3. In fact, this is considered a rollback attack because SVN=3 firmware contains a known vulnerability that is fixed in SVN=4 firmware. The device may be configured with mechanisms to mitigate such firmware rollback attacks. However, note that embodiments allow skipping SVNs, e.g., updating from SVN=1 directly to SVN=4 firmware is allowable.

Many devices may authenticate to more than one verifier. For example, an embedded processor or other device including a security processor may seek to authenticate to multiple content sources, such as Netflix™ or Hulu™ or other content providers. In this case, the device may be configured to use different credentials for different verifiers, so that even if one verifier is compromised, the device can still securely authenticate to other verifiers. In embodiments, this isolation may be achieved by adding a salt value to the seed in the credential generation process. In this case, the one-way function used to derive "Credential for SVN=m" (e.g., $220_m$ in FIG. 2) takes both seed (210) and a salt as input. If the chosen one-way function takes only one input, such as a hash function or scalar multiplication of elliptic curve, then the seed and the salt may be concatenated and used as input. In other cases, a one-way function may take more than one input, such as a MAC-based key derivation function. With this embodiment, multiple credential chains/touchstones can be derived using a single seed and different salts, one to be associated with each verifier.

In embodiments, a device may be configured to generate a so-called consolidated touchstone certificate that contains touchstones for all verifiers and a signature of a trusted CA. Note that the CA may be the vendor itself or a trusted third party, as discussed above. This consolidated touchstone certificate may be a data structure containing multiple touchstones (along with other data such as discussed above) and a single signature on these multiple touchstones. In an embodiment, a verifier receives the consolidated touchstone certificate from the device, and when verifying the device's identity, it uses only the touchstone allocated for it.

Embodiments may leverage the one-way property of one-way functions, so that credentials of all SVNs of device firmware are chained and provisioned at manufacturing. No credential update from remote server is needed post shipment. In addition a vendor's endorsements of all SVN credentials are covered in a single signature on fuses. As a result, no retrieval of new signatures in the field is needed. Thus with an embodiment, a single set of limited information (seed and CA signature) stored in fuse storage enables the device to authenticate to multiple verifiers with different and isolated credentials.

Figure 7:
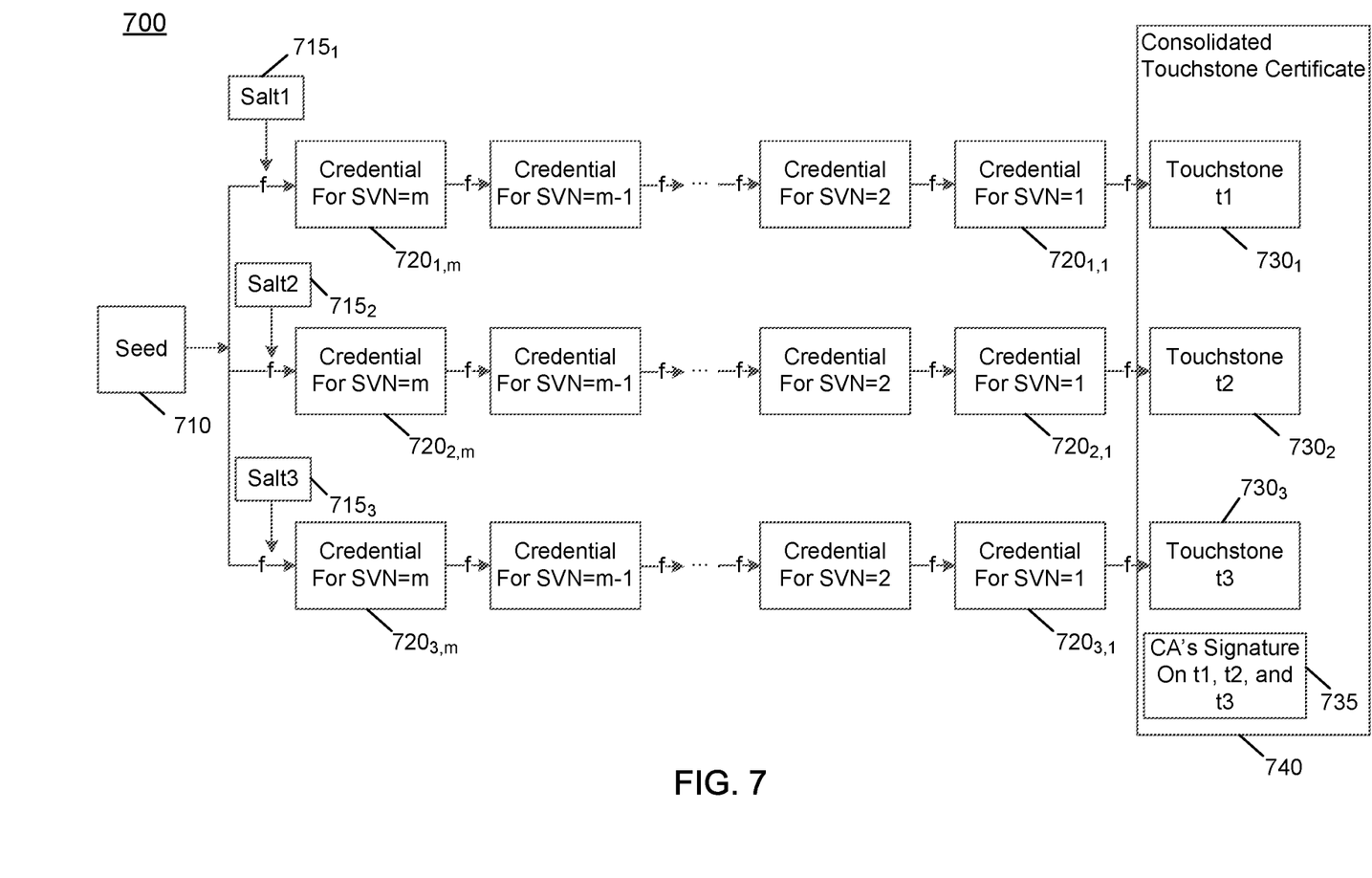
FIG. 7 is an illustration of multiple credential chains that are used to generate a consolidated touchstone certificate in accordance with an embodiment.

Referring now to FIG. 7, shown is an illustration of multiple credential chains that are used to generate a consolidated touchstone certificate in accordance with an embodiment. As illustrated in FIG. 7, in a manufacturing environment 700, a device may be manufactured that includes a consolidated touchstone certificate 740. As illustrated, certificate 740 includes multiple touchstones $730_1$-$730_3$ and a corresponding signature 735 which may act as a CA signature on these multiple touchstones. Understand while three touchstones are shown for ease of illustration, more or fewer touchstones may be present in a consolidated touchstone certificate in accordance with an embodiment. Also understand that touchstones 730 may be generated in firmware as discussed above with regard to FIG. 5. In this instance with multiple chains/touchstones, boot code may output multiple credentials to firmware that in turn generates multiple touchstones.

As illustrated in FIG. 7, these multiple touchstones may be generated so that each one can be allocated or associated with a given verification agent (such as a given external verifier system, e.g., for a given content provider or other authentication agent). As seen, a seed 710 may be common for generation of multiple credential chains. In turn, seed 710 is modified by a corresponding salt value $715_1$-$715_3$. In embodiments, salt value 715 may be a 32-bit number or an ASCII string that is used to ensure that different credentials are generated for each of the credential chains. In different embodiments, seed 710 may be marked up by a corresponding salt value 715 in different manners such as concatenating the seed and the salt. Thereafter, as discussed above with regard to FIG. 2, multiple credential chains are generated, e.g., a first credential chain having credentials $720_{1,m}$-$720_{1,1}$, and a final resulting credential that is a first touchstone value $730_1$. Similar operations are performed to generate additional credential chains to thus result in the three touchstones shown, namely touchstones $730_1$-$730_3$. As such, during manufacture, consolidated touchstone certificate 740, including its constituent touchstone 730 and signature 735, is formed.

With an arrangement of FIG. 7 three different verifiers can authenticate the device. And with consolidated touchstone certificate 740 containing touchstones $730_1$-$730_3$, for example, when authenticating to a second verifier, the device presents credential $720_{2,x}$, and the second verifier only uses touchstone $730_2$ in consolidated touchstone certificate 740 when verifying the presented credential. Understand while shown at this high level in the embodiment of FIG. 7, many variations and alternatives are possible.

Figure 8:
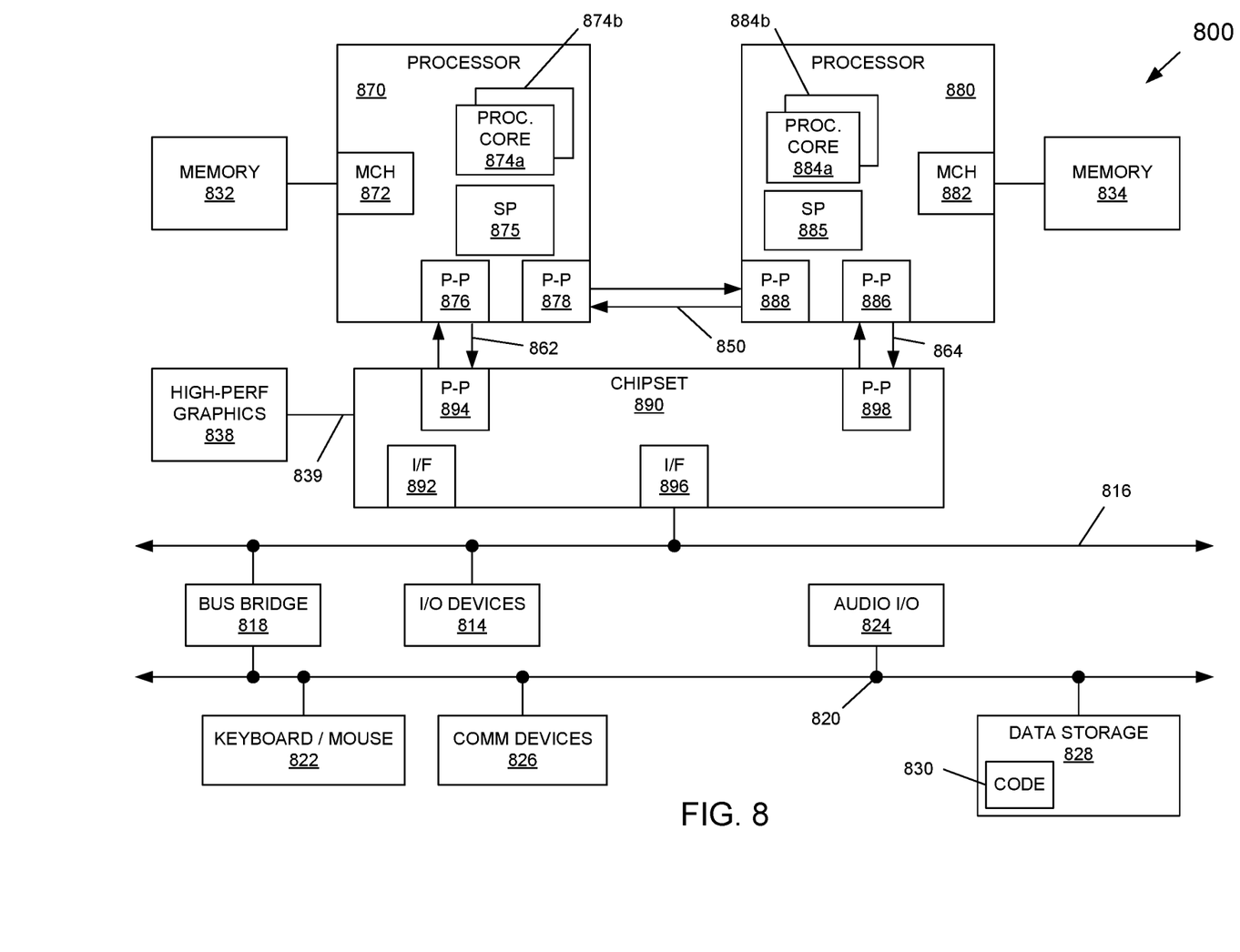
FIG. 8 is a block diagram of a system in accordance with an embodiment.

Embodiments may be implemented in many different system types. Referring now to FIG. 8, shown is a block diagram of a system in accordance with an embodiment of the present invention. As shown in FIG. 8, multiprocessor system 800 may be an authentication system such as of a remote authenticator. System 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processors 874a and 874b and processor cores 884a and 884b), although potentially many more cores may be present in the processors. Each of the processors can include a standalone security processor 875, 885 to perform remote credential-based authentication of device firmware, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems to perform authentication such as micro-servers or so forth.

The following examples pertain to further embodiments.

In one example, an apparatus includes a non-volatile storage to store a seed value and a signature, the signature based on an iterative execution of a function for a predetermined number of intervals, the predetermined number of intervals based at least in part on a maximum security version number for a firmware to be executed on a security processor of the apparatus. The apparatus may further include the security processor coupled to the non-volatile storage, where the security processor is to independently recover a credential for an updated version of the firmware based at least in part on the seed value and a security version number for the updated version of the firmware.

In an example, the signature is to be generated using at least a portion of a credential chain including a plurality of credentials each associated with a security version number for the firmware.

In an example, the security processor is, after an update to the firmware to the updated version of the firmware, to execute the function a first time using the seed and thereafter execute the function X additional times to recover the credential for the updated version of the firmware.

In an example, the security processor is to send the credential for the updated version of the firmware to an external verification system to enable the external verification system to authenticate the updated version of the firmware, where X corresponds to a number that is one more than the predetermined number of iterations less the security version number for the updated version of the firmware.

In an example, the security processor further is to send the signature, the security version number for the updated version of the firmware, and a touchstone value to the external verification system to enable the external verification system to authenticate the updated version of the firmware.

In an example, the security processor is further to execute the function another time using the credential, and thereafter execute the function for n additional times, n corresponding to the security version number, where an output of the function for a last iteration of the n additional times comprises the touchstone value.

In an example, the security processor is to receive one or more cryptographic keys from the external verification system in response to the authentication of the updated version of the firmware, and decrypt content received from the external verification system using the one or more cryptographic keys.

In an example the apparatus comprises a display to display the decrypted content.

In an example, the security processor is to generate a plurality of touchstone values of a consolidated certificate, where each of the plurality of touchstone values to be associated with one of a plurality of external verifiers.

In another example, method comprises: obtaining, in a security processor of a device, a seed value from a non-volatile storage of the device; executing, in the security processor, a function a first number of times, where an input to the function for a first one of the first number of times comprises the seed value and an output of the function for a last one of the first number of times comprises a credential for a firmware of the device, the firmware of the device corresponding to a $n^{th}$ version of the firmware, where the first number of times is based at least in part on a maximum supported number of versions of the firmware; and sending, to an external verifier, the credential via a secure channel coupled between the device and the external verifier to enable the external verifier to authenticate the firmware.

In an example, the method further comprises: executing the function n additional times, where an input to the function for a first iteration of the n additional times comprises the credential; and sending, to the external verifier, an output of the function for a last one of the n additional times as a touchstone value to enable the external verifier to compare the touchstone value to a result generated in the external verifier according to n executions of the function beginning with the credential.

In an example, the method further comprises obtaining a signature from the non-volatile storage and sending the signature to the external verifier, the signature based on the touchstone value and stored in the non-volatile storage during manufacture of the device.

In an example, the method further comprises: receiving one or more cryptographic keys from the external verifier, in response to the authentication of the firmware by the external verifier; and storing the one or more cryptographic keys in the secure storage of the device.

In an example, the method further comprises decrypting content received from the external verifier using the one or more cryptographic keys.

In an example, the method further comprises sending a consolidated certificate to a plurality of external verifiers to enable the plurality of external verifiers to authenticate the firmware, where at least some of the plurality of external verifiers is to use a different touchstone value of the consolidated certificate to authenticate the firmware.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor to execute instructions; a communication circuit to communicate with a device to couple to the system; and a storage medium including instructions that when executed enable the system to: receive, from the device, a first value, a credential for a current firmware version of the device and a second value corresponding to a version number associated with the current firmware version; execute a function for a plurality of iterations corresponding to the second value to obtain a comparison value; and authenticate the device based at least in part on the comparison value.

In an example, the storage medium further comprises instructions that when executed enable the system to authenticate the device in response to the comparison value matching the first value.

In an example, the storage medium further comprises instructions that when executed enable the system, in response to the authentication, to send one or more cryptographic keys to the device, to enable the device to decrypt content.

In an example, the storage medium further comprises instructions that when executed enable the system to: receive, from the device, a signature associated with the first value, verify the signature with a first key, the first key comprising a public key of a provider of the firmware; and in response to the verification of the signature, execute the function for the plurality of iterations.

In an example, the storage medium further comprises instructions that when executed enable the system to: receive, from the device, a consolidated certificate comprising a signature and a plurality of first values, where each of the plurality of first values is to be associated with at least one of a plurality of verification entities; and verify the signature with a key comprising a public key of a provider of the firmware, the signature based on the plurality of first values.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a non-volatile storage to store a seed value and a signature, the signature based on an iterative execution of a function for a predetermined number of intervals, the predetermined number of intervals based at least in part on a maximum security version number for a firmware to be executed on a security processor of the apparatus; and
   the security processor coupled to the non-volatile storage, wherein the security processor is to independently recover a credential for an updated version of the firmware based at least in part on the seed value and a security version number for the updated version of the firmware.

2. The apparatus of claim 1, wherein the signature is to be generated using at least a portion of a credential chain including a plurality of credentials each associated with a security version number for the firmware.

3. The apparatus of claim 1, wherein the security processor is, after an update to the firmware to the updated version of the firmware, to execute the function a first time using the seed value and thereafter execute the function X additional times to recover the credential for the updated version of the firmware.

4. The apparatus of claim 3, wherein the security processor is to send the credential for the updated version of the firmware to an external verification system to enable the external verification system to authenticate the updated version of the firmware, wherein X corresponds to a number that is one more than the predetermined number of iterations less the security version number for the updated version of the firmware.

5. The apparatus of claim 4, wherein the security processor further is to send the signature, the security version number for the updated version of the firmware, and a touchstone value to the external verification system to enable the external verification system to authenticate the updated version of the firmware.

6. The apparatus of claim 5, wherein the security processor is further to execute the function another time using the credential, and thereafter execute the function for n additional times, n corresponding to the security version number, wherein an output of the function for a last iteration of the n additional times comprises the touchstone value.

7. The apparatus of claim 5, wherein the security processor is to receive one or more cryptographic keys from the external verification system in response to the authentication of the updated version of the firmware, and decrypt content received from the external verification system using the one or more cryptographic keys.

8. The apparatus of claim 7, wherein the apparatus comprises a display, the display to display the decrypted content.

9. The apparatus of claim 1, wherein the security processor is to generate a plurality of touchstone values of a consolidated certificate, wherein each of the plurality of touchstone values to be associated with one of a plurality of external verifiers.

10. At least one non-transitory computer readable storage medium having stored thereon instructions, which if performed by a machine cause the machine to perform a method comprising:
    obtaining, in a security processor of a device, a seed value from a non-volatile storage of the device;
    executing, in the security processor, a function a first number of times, wherein an input to the function for a first one of the first number of times comprises the seed value and an output of the function for a last one of the first number of times comprises a credential for a firmware of the device, the firmware of the device corresponding to a nth version of the firmware, wherein the first number of times is based at least in part on a maximum supported number of versions of the firmware; and
    sending, to an external verifier, the credential via a secure channel coupled between the device and the external verifier to enable the external verifier to authenticate the firmware.

11. The at least one non-transitory computer readable storage medium of claim 10, wherein the method further comprises:
    executing the function n additional times, wherein an input to the function for a first iteration of the n additional times comprises the credential; and
    sending, to the external verifier, an output of the function for a last one of the n additional times as a touchstone value to enable the external verifier to compare the touchstone value to a result generated in the external verifier according to n executions of the function beginning with the credential.

12. The at least one non-transitory computer readable storage medium of claim 11, wherein the method further comprises obtaining a signature from the non-volatile storage and sending the signature to the external verifier, the signature based on the touchstone value and stored in the non-volatile storage during manufacture of the device.

13. The at least one non-transitory computer readable storage medium of claim 11, wherein the method further comprises:
    receiving one or more cryptographic keys from the external verifier, in response to the authentication of the firmware by the external verifier; and
    storing the one or more cryptographic keys in the secure storage of the device.

14. The at least one non-transitory computer readable storage medium of claim 13, wherein the method further comprises decrypting content received from the external verifier using the one or more cryptographic keys.

15. The at least one non-transitory computer readable storage medium of claim 11, wherein the method further comprises sending a consolidated certificate to a plurality of external verifiers to enable the plurality of external verifiers to authenticate the firmware, wherein at least some of the plurality of external verifiers are to use a different touchstone value of the consolidated certificate to authenticate the firmware.

16. A system comprising:
a processor to execute instructions;
a communication circuit to communicate with a device to couple to the system; and
a storage medium including instructions that when executed enable the system to:
receive, from the device, a first value, a credential for a current firmware version of the device and a second value corresponding to a version number associated with the current firmware version;
execute a function for a plurality of iterations corresponding to the second value to obtain a comparison value; and
authenticate the device based at least in part on the comparison value.

17. The system of claim 16, wherein the storage medium further comprises instructions that when executed enable the system to authenticate the device in response to the comparison value matching the first value.

18. The system of claim 17, wherein the storage medium further comprises instructions that when executed enable the system, in response to the authentication, to send one or more cryptographic keys to the device, to enable the device to decrypt content.

19. The system of claim 17, wherein the storage medium further comprises instructions that when executed enable the system to:
receive, from the device, a signature associated with the first value,
verify the signature with a first key, the first key comprising a public key of a provider of the firmware; and
in response to the verification of the signature, execute the function for the plurality of iterations.

20. The system of claim 17, wherein the storage medium further comprises instructions that when executed enable the system to:
receive, from the device, a consolidated certificate comprising a signature and a plurality of first values, wherein each of the plurality of first values is to be associated with at least one of a plurality of verification entities; and
verify the signature with a key comprising a public key of a provider of the firmware, the signature based on the plurality of first values.

* * * * *